United States Patent
Lv et al.

(10) Patent No.: US 12,184,424 B2
(45) Date of Patent: Dec. 31, 2024

(54) DATA FRAME TRANSMISSION METHOD AND APPARATUS, AND STORAGE MEDIUM

(71) Applicant: ZTE CORPORATION, Shenzhen (CN)

(72) Inventors: Jianfeng Lv, Shenzhen (CN); Ning Wei, Shenzhen (CN); Nan Li, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 394 days.

(21) Appl. No.: 17/295,402

(22) PCT Filed: Nov. 19, 2019

(86) PCT No.: PCT/CN2019/119416
§ 371 (c)(1),
(2) Date: May 19, 2021

(87) PCT Pub. No.: WO2020/103818
PCT Pub. Date: May 28, 2020

(65) Prior Publication Data
US 2022/0006574 A1    Jan. 6, 2022

(30) Foreign Application Priority Data
Nov. 19, 2018  (CN) .......................... 201811374189.5

(51) Int. Cl.
*H04L 1/1812* (2023.01)
*H04L 1/00* (2006.01)
(Continued)

(52) U.S. Cl.
CPC .......... *H04L 1/1819* (2013.01); *H04L 1/0007* (2013.01); *H04L 1/1822* (2013.01); *H04L 1/1896* (2013.01); *H04L 1/0059* (2013.01)

(58) Field of Classification Search
CPC ... H04L 1/1819; H04L 1/0007; H04L 1/1822; H04L 1/1896; H04L 1/0059; H04L 1/1825; H04L 1/1812
See application file for complete search history.

(56) References Cited

U.S. PATENT DOCUMENTS

2010/0017674 A1 * 1/2010 Mo .................. H04L 1/1825
                                                    714/E11.113
2012/0002610 A1   1/2012 Widegren et al.
(Continued)

FOREIGN PATENT DOCUMENTS

CN    101534179 A    9/2009
CN    107404367 A   11/2017
(Continued)

OTHER PUBLICATIONS

International Search Report for Application No. PCT/CN2019/119416, dated Feb. 3, 2020, 4 pages including English translation.
(Continued)

Primary Examiner — Jae Y Lee
(74) Attorney, Agent, or Firm — Morgan, Lewis & Bockius LLP

(57) ABSTRACT

Provided are a method and apparatus for transmitting a data frame and a storage medium. The method for transmitting a data frame includes that a sender adds a hybrid automatic repeat request (HARQ)-related field into the data frame and that the sender transmits the data frame with the added HARQ-related field to a receiver. The HARQ-related field includes a HARQ indication field and an identity identification field, the HARQ indication field indicates whether the data frame is required to be processed according to a HARQ process, and the identity identification field indicates an identity identification of a target receiver of the data frame.

12 Claims, 3 Drawing Sheets

(51) Int. Cl.
  *H04L 1/1822* (2023.01)
  *H04L 1/1867* (2023.01)

(56) References Cited

U.S. PATENT DOCUMENTS

| | | | |
|---|---|---|---|
| 2015/0236823 | A1 | 8/2015 | Djukic et al. |
| 2018/0270807 | A1 | 9/2018 | Salem et al. |
| 2019/0182095 | A1* | 6/2019 | Suh ........................ H04L 1/0003 |
| 2019/0280819 | A1* | 9/2019 | Määttanen ............ H04L 1/1887 |
| 2020/0052832 | A1* | 2/2020 | Tian ........................ H04L 1/1614 |
| 2020/0068537 | A1* | 2/2020 | Oh ........................ H04L 1/1896 |
| 2020/0412491 | A1* | 12/2020 | Lu ........................ H04L 1/1621 |
| 2021/0399838 | A1* | 12/2021 | Lou ........................... H04L 1/08 |
| 2021/0409165 | A1* | 12/2021 | Wang .................... H04L 1/1822 |

FOREIGN PATENT DOCUMENTS

| | | |
|---|---|---|
| CN | 108633020 A | 10/2018 |
| WO | WO2008108527 A1 | 9/2008 |
| WO | WO2015006640 A1 | 1/2015 |

OTHER PUBLICATIONS

European Search Report in application No. 19887125.3 dated Jun. 27, 2022, 7 pages.
Qualcomm Incorporated, "On explicit and implicit MCS signaling in DCI for HARQ retransmissions", 3GPP TSG-RAN WG4 #60, R4-114205, Aug. 22-26, 2011, Athens, Greece, 2 pages.
Chinese Office Action in Application No. 201811374189.5 dated Aug. 30, 2022, 16 pages, including English Translation.
Supplemental Chinese Search Report in Application No. 201811374189.5 dated Aug. 24, 2022, 3 pages, including English Translation.
Catt, "HARQ and scheduling timing design for LTE processing timing reduction with 1ms TTI", 3GPP TSG RAN WG1 Meeting #88, R1-1702043, Athens, Greece Feb. 13-17, 2017, 5 pages.
Chinese Office Action for Application No. 201811374189.5, dated Mar. 17, 2022, 18 pages including translation.
Chinese Search Report for Application No. 201811374189.5, dated Mar. 30, 2022, 6 pages including translation.

* cited by examiner

DATA FRAME TRANSMISSION METHOD AND APPARATUS, AND STORAGE MEDIUM

CROSS REFERENCE TO RELATED APPLICATIONS

This is a national stage application filed under 37 U.S.C. 371 based on International Patent Application No. PCT/CN2019/119416, filed Nov. 19, 2019, which claims priority to Chinese Patent Application No. 201811374189.5 filed with the CNIPA Nov. 19, 2018, the disclosure of which are incorporated herein by reference in their entireties.

TECHNICAL FIELD

The present disclosure relates to the field of communications.

BACKGROUND

If a sender waits for a positive acknowledgement before preparing the next data item in a protocol, such a protocol is referred to as an automatic repeat request (ARQ) protocol. The ARQ protocol recovers a wrong data frame by requesting the sender to retransmit a data frame corresponding to the wrong data frame, which is one of the methods used to deal with an error caused by a channel in communications.

However, in a data frame transmission manner based on the ARQ protocol, if the data frame received by a receiver is wrong, the receiver will directly discard the wrong data frame without storing it, then the sender will retransmit the data frame corresponding to the wrong data packet, and the receiver will only decode the retransmitted data packet. Therefore, the data frame transmission manner based on the ARQ will lead to large delay and low data transmission efficiency.

SUMMARY

According to an aspect of the present disclosure, a method for transmitting a data frame is provided. The method includes that a sender adds a hybrid automatic repeat request (HARQ)-related field into the data frame and that the sender transmits the data frame with the added HARQ-related field to at least one receiver. The HARQ-related field includes a HARQ indication field and an identity identification field, the HARQ indication field indicates whether the data frame is required to be processed according to a HARQ process, and the identity identification field indicates an identity identification of a target receiver of the data frame to determine a transmission target of the data frame.

According to another aspect of the present disclosure, a method for transmitting a data frame is provided. The method includes: a receiver receives a data frame from a sender, where the data frame carries a HARQ-related field; and the receiver processes the data frame according to the HARQ-related field. The HARQ-related field includes a HARQ indication field and an identity identification field, the HARQ indication field indicates whether the data frame is required to be processed according to a HARQ process, and the identity identification field indicates an identity identification of a target receiver of the data frame.

According to another aspect of the present disclosure, an apparatus for transmitting a data frame is provided. The apparatus includes an adding module configured to add a HARQ-related field into the data frame and a transmission module configured to transmit the data frame with the added HARQ-related field to at least one receiver. The HARQ-related field includes a HARQ indication field and an identity identification field, the HARQ indication field indicates whether the data frame is required to be processed according to a HARQ process, and the identity identification field indicates an identity identification of a target receiver of the data frame.

According to another aspect of the present disclosure, an apparatus for transmitting a data frame is provided. The apparatus includes a receiving module and a processing module. The receiving module is configured to receive a data frame from a sender, where the data frame carries a HARQ-related field. The processing module is configured to process the data frame according to the HARQ-related field. The HARQ-related field includes a HARQ indication field and an identity identification field, the HARQ indication field indicates whether the data frame is required to be processed according to a HARQ process, and the identity identification field indicates an identity identification of a target receiver of the data frame.

According to another aspect of the present disclosure, a sending terminal is provided and includes a memory and a processor. The memory stores a computer program, and the computer program is configured to, when executed by the processor, implement the preceding method for transmitting a data frame.

According to another aspect of the present disclosure, a receiving terminal is provided and includes a memory and a processor. The memory stores a computer program, and the computer program is configured to, when executed by the processor, implement the preceding method for transmitting a data frame.

According to another aspect of the present disclosure, a non-transitory computer-readable storage medium is provided. The storage medium stores a computer program, and the computer program is configured to, when executed, implement the preceding method for transmitting a data frame.

DETAILED DESCRIPTION

To illustrate the objects, technical solutions and advantages of the present disclosure clearer, the technical solutions of the present disclosure are described clearly and completely hereinafter through embodiments of the present disclosure and corresponding drawings. It is to be understood that the embodiments described herein are merely intended to explain the present disclosure and not to limit the present disclosure.

A method for transmitting a data frame according to embodiments of the present disclosure may involve data frame transmission between a sender and a receiver. The sender may be any terminal having a data frame sending capability, such as an access point (AP), a router, a laptop and a mobile phone, etc. The receiver may be any terminal having a data frame receiving capability, such as an access point (AP), a router, a laptop and a mobile phone, etc. The sender and the receiver may be terminals in the same wireless local area network.

According to embodiments of the present disclosure, both the sender and the receiver may maintain multiple hybrid automatic repeat request (HARQ) processes, and the sender may use multiple HARQ processes to transmit different data fields to the same target receiver.

According to embodiments of the present disclosure, the sender may maintain multiple HARQ processes, while each receiver may maintain merely one HARQ process. In this case, the sender may use multiple HARQ processes to transmit data fields to multiple receivers. However, a receiver may merely receive one type of data field at the same time.

Figure 1:
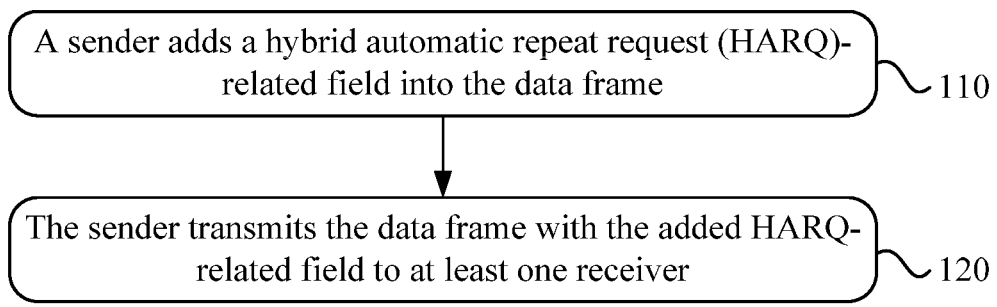
FIG. 1 is a flowchart of a method for transmitting a data frame according to an embodiment of the present disclosure.

FIG. 1 is a flowchart of a method for transmitting a data frame according to an embodiment of the present disclosure. Referring to FIG. 1, the method for transmitting a data frame according to the embodiment of the present disclosure may include steps 110 and 120.

In step 110, a sender adds a HARQ-related field into the data frame.

According to embodiments of the present disclosure, the sender may add the HARQ-related field at any suitable location in the data frame. For example, the HARQ-related field is added to the preamble of the data frame. The HARQ-related field may be added to one or more signaling messages in the preamble section as required. Furthermore, one or more pieces of indication information included in the HARQ-related field may be located in the same signaling message of the preamble of the data frame or in different signaling messages of the preamble of the data frame.

In step 120, the sender transmits the data frame with the added HARQ-related field to at least one receiver.

According to an implementation of the present disclosure, the sender and the at least one receiver may be in the same wireless local area network.

The HARQ-related field may include a HARQ indication field and an identity identification field, the HARQ indication field may indicate whether the data frame is required to be processed according to a HARQ process, and the identity identification field may indicate an identity identification of a target receiver among the at least one receiver to determine the transmission target of the data frame.

According to embodiments of the present disclosure, the identity identification may be any identification that can uniquely identify a receiver over a period of time or within a range or process. For example, the identity identification may be the MAC address of the receiver, the sequence number (for example, key identification or packet identification, etc.) in a basic service set of the receiver, the calculated value related to the MAC address of the receiver, and the like. The target receiver according to embodiments of the present disclosure may be an object to which the sender intends to send a data frame. The target receiver may be one of the multiple receivers. The identity identification of the target receiver may be the same as the identity identification carried in the data frame to which the HARQ-related field has been added. For example, after the sender sends the data frame to multiple receivers, each of the multiple receivers compares its own identity identification with the identity identification carried in the data frame. The receiver whose identity identification is the same as the identity identification carried in the data frame may be used as the target receiver.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency.

Meanwhile, in a case where the sender and the at least one receiver are in the same wireless local area network, the method for transmitting a data frame according to embodiments of the present disclosure can introduce the HARQ mechanism into the data frame processing in the wireless local area network and can greatly improve the efficiency of data transmission in the wireless local area network.

According to embodiments of the present disclosure, the representation manner of the HARQ indication field includes an explicit representation and an implicit representation. The explicit representation refers to using at least one bit to indicate whether the data frame is required to be processed according to the HARQ process. The implicit representation refers to indirectly indicating whether the data frame is required to be processed according to the HARQ process through whether a modulation scheme of one or more data blocks in the data frame is different from a preset modulation scheme of the one or more data blocks. When the explicit representation is used for the HARQ indication field, whether the data frame is required to be processed according to the HARQ process can be quickly acquired through a bit, thus the processing speed and efficiency are high. For example, n (n is an integer and n≥1) bits are used to explicitly indicate whether the data frame is required to be processed according to the HARQ process. For example, when n is equal to 1, a field value equal to 1 (or 0) indicates that the current data frame is a HARQ frame, that is, the data frame is required to be processed according to the HARQ process; accordingly, the field value equal to 0 (or 1) indicates that the current data frame is not a HARQ frame, that is, the data frame is not required to be processed according to the HARQ process.

When the implicit representation is used for the HARQ indication field, the length of the HARQ indication field is zero, so the communication overhead can be saved. When the implicit representation is used for the HARQ indication field, it may be set that modulating one or more data blocks in the data frame are performed by one modulation scheme (for example, binary phase shift keying (BPSK) modulation) so that the data frame is required to be processed according to the HARQ process and modulating one or more data blocks in the data frame are performed by other modulation schemes (for example, quadrate-BPSK (Q-BPSK) modulation) so that the data frame is not required to be processed according to the HARQ process. It may also be set that modulating one or more data blocks in the data frame are performed by one modulation scheme (for example, BPSK modulation) so that the data frame is required to be processed according to the HARQ process and modulating one or more data blocks in the data frame are performed by other modulation schemes (for example, Q-BPSK modulation) so that the data frame is not required to be processed according to the HARQ process. Of course, the embodiments of the present disclosure are not limited thereto, and the implicit representation may also indicate, through the difference in modulation mode between symbols, whether the data frame is required to be processed according to the HARQ process. For example, whether the current data frame is a HARQ frame is indicated based on whether a specific constellation point modulation is used for a data block (for example, an orthogonal frequency division multiplexing (OFDM) symbol) designated in the preamble of the data frame. Alternatively, whether the current data frame is a HARQ frame is indicated based on whether a constellation point modulation is used for multiple specified data blocks according to a sequence rule.

According to embodiments of the present disclosure, the HARQ-related field may also include other fields. For example, the HARQ-related field may also include at least one of a retransmission indication field, a combining manner indication field, a redundancy version identifier, a HARQ process identifier or a frame number. The retransmission indication field indicates whether the data frame is a retransmission frame. According to embodiments of the present disclosure, if a data frame is not transmitted for the first time or includes the same information as a previously transmitted data frame, the data frame may be a retransmission frame. The combining manner indication field is used for indicating the manner in which data frames are combined (for example, chase combine (CC) or incremental redundancy (IR)). The combining manner may represent the manner in which one data frame and another data frame are combined. The redundancy version identifier is used for indicating the redundancy version of the data frame. When redundancy information bits are generated after the information bits transmitted in the data frame are coded at least part of these redundancy information bits are required to be carried in the data frame for transmission. Data frames of different redundancy versions are generated due to different redundancy information bits carried by the data frame. The redundancy version identifier is used for indicating which part the redundancy information bits carried in the data frame belong to among all redundancy information bits. The HARQ process identifier is used for indicating the process number used when the data frame is processed. The HARQ process may be a process from starting a data transmission to receiving the data transmission and then to acknowledgement. The sender and the receiver may simultaneously perform multiple HARQ processes. To distinguish these processes, each process is assigned a HARQ process number for indication. The frame number is an identifier indicating information transmitted in the data frame, and information transmitted in data frames having a same frame number is the same. One or more pieces of the preceding indication information are added to the data frame as required so that various operations of the receiver can be assisted and the HARQ function can be better implemented. For example, the receiver is instructed how to store and combine data frames.

According to an implementation of the present disclosure, when the HARQ-related field includes the retransmission indication field, an explicit representation and an implicit representation are included for the retransmission indication field. For the explicit representation, at least one bit may be used to indicate whether the data frame is a retransmission frame. The implicit representation may refer to indirectly indicating whether the data frame is a retransmission frame through whether a modulation scheme of one or more data blocks in the data frame is different from a preset modulation scheme of the one or more data blocks. Alternatively, the implicit representation may refer to indirectly indicating whether the data frame is the retransmission frame according to whether the receiver is able to find a target frame of the data frame. If the target frame of the data frame can be found, the data frame is a retransmission frame. If the target frame of the data frame cannot be found, the data frame is not a retransmission frame. The target frame of the data frame refers to a data frame which is previously received by the receiver and transmits the same data information as the data frame. The target frame may be a data frame when a piece of data information is transmitted for the first time, a data frame when a piece of data information is retransmitted for a certain time, or a data frame obtained by combining data frames in which a piece of data information is previously transmitted several times. The implicit representation may be embodied by designating the modulation scheme of one or more data blocks and designating the frame length of the data frame.

When the explicit representation is used for the retransmission indication field, whether the data frame is a retransmission frame can be quickly acquired through a bit. In this manner, the processing speed and efficiency are high. For example, n bits (n is an integer, and n≥1) are used to explicitly indicate whether the data frame is a retransmission frame. For example, when n is equal to 1, a field value equal to 1 (or 0) indicates that the current data frame is a retransmission frame; accordingly, the field value equal to 0 (or 1) indicates that the current data frame is not a retransmission frame.

When the implicit representation is used for the retransmission indication field, the length of the retransmission indication field is zero, so the communication overhead can be saved. When the implicit representation based on a modulation scheme is used for the retransmission indication field, it may be set that modulating one or more data blocks in the data frame are performed by one modulation scheme (for example, BPSK modulation) so that the data frame is a retransmission frame and modulating one or more data blocks in the data frame are performed by other modulation schemes (for example, Q-BPSK modulation) so that the data frame is not a retransmission frame. It may also be set that modulating one or more data blocks in the data frame are performed by one modulation scheme (for example, BPSK modulation) so that the data frame is not a retransmission frame and modulating one or more data blocks in the data frame are performed by other modulation schemes (for example, Q-BPSK modulation) so that the data frame is a retransmission frame. Of course, the embodiments of the present disclosure are not limited thereto, and whether the data frame is a retransmission frame may also be indicated by the difference between modulation schemes of symbols. For example, whether the current data frame is a retransmission frame is indicated based on whether a specific constellation point modulation is used for a data block (for example, an OFDM symbol) designated in the preamble of the data frame. Alternatively, whether the current data frame is a retransmission frame is indicated based on whether a constellation point modulation is used for multiple specified data blocks according to a sequence rule.

According to embodiments of the present disclosure, when the receiver supports a data frame combining manner or the sender and the receiver predetermine to adopt a combining manner, the sender may not add a combining manner indication field to the data frame. In this case, the data frames are combined in the data frame combining manner supported by the receiver. When the receiver and the sender do not predefine a combining manner, the sender may add a combining manner indication field to the data frame. In this case, the data frames may be combined in a combining manner indicated by the combining manner indication field. In this manner, whether to add the combining manner indication field can be chosen according to the actual needs so as to better satisfy the actual application requirements.

According to embodiments of the present disclosure, the combining manner of the data frame may be determined by the sender or by the sender and the receiver through negotiation. In a case where the combining manner of the data frame is determined by the sender, the sender may adaptively determine the combining manner of the data frame according to a channel state, add the determined combining manner to the data frame through the combining manner indication field, and send the determined combining manner to the receiver. In this manner, after receiving the data frame, the receiver can know the combining manner according to the combining manner indication field and combine data frames. In a case where the combining manner of the data frame is determined by the sender and the receiver through negotiation, the sender may negotiate with the receiver in advance to determine the combining manner of the data frame before transmitting the data frame, and the sender does not change the transmission manner during the transmission of the data frame. In this manner, after receiving the data frame, the receiver can combine the data frame in the predefined combining manner. Through the above ways to determine the combining manner of the data frame, the combining manner of the data frame can be flexibly determined, thus better satisfying the transmission requirements.

Figure 2:
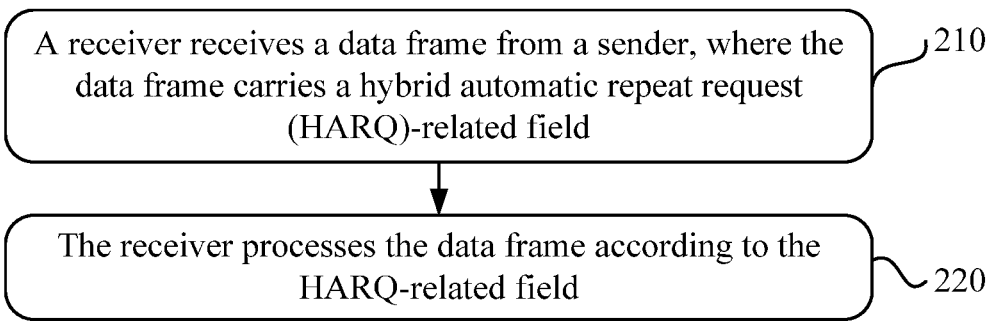
FIG. 2 is a flowchart of a method for transmitting a data frame according to another embodiment of the present disclosure.

FIG. 2 is a flowchart of a method for transmitting a data frame according to another embodiment of the present disclosure. Referring to FIG. 2, the method for transmitting a data frame according to the embodiment of the present disclosure may include steps 210 and 220.

In step 210, a receiver receives a data frame from a sender, where the data frame carries a HARQ-related field.

In step 220, the receiver processes the data frame according to the HARQ-related field.

According to embodiments of the present disclosure, the HARQ-related field includes a HARQ indication field and an identity identification field, the HARQ indication field indicates whether the data frame is required to be processed according to a HARQ process, and the identity identification field indicates an identity identification of a target receiver of the data frame.

The target receiver according to embodiments of the present disclosure may be an object to which the sender intends to send a data frame. The target receiver may be one of multiple receivers. The identity identification of the target receiver is the same as the identity identification carried in the data frame. For example, after receiving a data frame from the sender, the receiver compares the identity identification of the receiver with the identity identification carried in the data frame. The receiver whose identity identification is the same as the identity identification carried in the data frame may be used as the target receiver.

According to embodiments of the present disclosure, the receiver can process the data frame according to the HARQ-related field in the data frame after receiving the data frame with the added HARQ-related field. Compared with the traditional ARQ processing method, the data frame processing based on the HARQ can improve the data transmission efficiency. Meanwhile, according to embodiments of the present disclosure, the HARQ mechanism is introduced into the data frame processing in the wireless local area network. The efficiency of data transmission in the wireless local area network can be greatly improved.

According to embodiments of the present disclosure, the receiver and the sender may be in the same wireless local area network. In a case where the sender and the receiver are in the same wireless local area network, the method for transmitting a data frame according to embodiments of the present disclosure can introduce the HARQ mechanism into the data frame processing in the wireless local area network and can greatly improve the efficiency of data transmission in the wireless local area network.

According to embodiments of the present disclosure, the step 220 in which the receiver processes the data frame according to the HARQ-related field may include the following: when the HARQ indication field obtained by the receiver (for example, by decoding the data frame) indicates that the data frame is not required to be processed according to the HARQ process, the HARQ-related field in the data frame may be skipped and the remaining part in the data frame other than the HARQ-related field continues to be processed (for example, the decoding continues), and the data frame may be discarded when the remaining part in the data frame cannot be correctly processed (for example, not correctly decoded). According to embodiments of the present disclosure, the receiver may determine, according to the HARQ indication field, whether the data frame (such as the data frame in the wireless local area network) is required to be processed according to the HARQ process. When the processing is not required to be performed according to the HARQ process, the HARQ-related field in the data frame is skipped and the remaining part in the data frame other than the HARQ-related field continues to be processed. In this manner, the processing speed can be improved. Meanwhile, an acknowledgement (ACK) may be replied when the remaining part in the data frame is correctly processed (for example, decoded), and the data frame may be discarded to save storage space when the remaining part in the data frame is not correctly processed (for example, decoded).

According to embodiments of the present disclosure, when the receiver decides that a reply is required to be made to the sender, the content of the reply may include the HARQ process identifier if the HARQ process identifier is included in the HARQ-related field.

According to embodiments of the present disclosure, the step 220 in which the receiver processes the data frame according to the HARQ-related field may include the following: when the identity identification field obtained by the receiver (for example, through decoding) is different from the identity identification field of the receiver, the receiver may stop processing the data frame and discard the data frame. According to embodiments of the present disclosure, the receiver may first acquire the identity identification field of the data frame and determine whether the receiver itself is the target receiver according to the identity identification field of the data frame. When the receiver is not the target receiver, the receiver may stop the processing and discard the data frame. In this manner, the processing speed can be improved and the storage space can be saved.

According to embodiments of the present disclosure, the step 220 in which the receiver processes the data frame according to the HARQ-related field may include the following: the receiver processes (for example, decodes) the data frame; when the HARQ-related field obtained by the receiver through processing (for example, decoding) indicates that the data frame is required to be processed according to the HARQ process, the identity identification field carried by the data frame is acquired; when the identity identification field acquired by the receiver is the same as the identity identification field of the receiver, the receiver determines whether the data frame is a retransmission frame. According to embodiments of the present disclosure, the receiver sequentially acquires the HARQ indication field and the identity identification field, so that merely the target receiver that satisfies a condition performs the next step of processing, and other receivers that do not satisfy the condition do not perform the next step of processing. In this manner, the reliability of processing can be ensured.

According to embodiments of the present disclosure, the step 220 in which the receiver processes the data frame according to the HARQ-related field may include the following: the receiver processes (for example, decodes) the data frame; when the identify identification field obtained by the receiver through processing (for example, decoding) is the same as the identify identification field of the receiver, the HARQ indication field is acquired; when the HARQ indication field indicates that the data frame is required to be processed according to the HARQ process, the receiver determines whether the data frame is a retransmission frame. According to embodiments of the present disclosure, the receiver sequentially acquires the identity identification field and the HARQ indication field, so that merely the target receiver that satisfies a condition performs the next step of processing, and other receivers that do not satisfy the condition do not perform the next step of processing. In this manner, the reliability of processing can be ensured.

According to embodiments of the present disclosure, whether a received data frame is a retransmission frame may be determined in various different manners. These manners are described below.

According to embodiments of the present disclosure, the HARQ-related field includes a retransmission indication field, and the receiver determining whether the data frame is the retransmission frame may include that: the receiver determines whether the data frame is the retransmission frame according to the retransmission indication field. A representation manner of the retransmission indication field includes an explicit representation and an implicit representation. The explicit representation refers to that the receiver determines whether the data frame is the retransmission frame through a bit in the retransmission indication field of the data frame. The implicit representation refers to indirectly indicating whether the data frame is the retransmission frame through whether a modulation scheme of one or more data blocks in the data frame is different from a preset modulation scheme of the one or more data blocks and/or indirectly indicating whether the data frame is the retransmission frame according to whether the receiver is able to find a target frame of the data frame. According to embodiments of the present disclosure, whether a data frame is a retransmission frame may be determined through the explicit representation and/or the implicit representation. In this manner, the speed of determining a retransmission frame is higher and the processing efficiency is higher.

According to embodiments of the present disclosure, in a case where the implicit representation of indirectly indicating whether the data frame is the retransmission frame through whether the modulation scheme of the one or more data blocks in the data frame is different from the preset modulation scheme of the one or more data blocks is adopted for the retransmission indication field, the receiver determines whether the data frame is the retransmission frame according to the retransmission indication field may include the following: the receiver obtains a modulation scheme of one or more designated data blocks; in response to the modulation scheme of the one or more designated data blocks being the preset modulation scheme corresponding to the retransmission indication field, the data frame is the retransmission frame; and in response to the modulation scheme of the one or more designated data blocks not being the preset modulation scheme corresponding to the retransmission indication field, the data frame is not the retransmission frame. Here, the preset modulation scheme corresponding to the retransmission indication field may be a modulation scheme of one or more data blocks, and in the case of multiple data blocks, the multiple data blocks may be continuous data blocks or discontinuous data blocks. For example, if the retransmission indication field indicates that the second data block is adjusted by using a BPSK scheme, and if the modulation scheme of the second data block of the received data frame is the BPSK scheme (that is, the modulation schemes of the two are the same and have no difference), it can be determined that the received data frame is a retransmission frame. For example, if the retransmission indication field indicates that the second data block and the third data block are adjusted by using a BPSK scheme, and if the modulation schemes of the second data block and the third data block of the received data frame are not the BPSK scheme (that is, the modulation schemes of the two are different and have a difference), it can be determined that the received data frame is not a retransmission frame. According to embodiments of the present disclosure, whether the data frame is a retransmission frame is determined based on the modulation scheme and thus the communications overhead can be reduced.

According to embodiments of the present disclosure, the implicit representation of indirectly indicating whether the data frame is the retransmission frame according to whether the receiver is able to find the target frame of the data frame may also be adopted for the retransmission indication field. In this case, the step in which the receiver determines whether the data frame is the retransmission frame according to the retransmission indication field includes: in a case where the receiver searches for and determines the target frame, determining that the data frame is the retransmission frame; and in a case where the receiver does not find the target frame, determining that the data frame is not the retransmission frame.

In a case where indirectly indicating whether the data frame is the retransmission frame according to whether the receiver is able to find the target frame of the data frame is adopted for the retransmission indication field, the target frame may be searched for base on the frame length of the data frame. Specifically, the receiver determining whether the data frame is a retransmission frame according to the retransmission indication field may include the following: the receiver acquires the frame length of the data frame and searches for a data frame having a same frame length as the data frame in a storage area (for example, cache area); in response to finding the data frame having the same frame length as the data frame (the found data frame is the target frame), the data frame is determined to be the retransmission frame; and in response to not finding the data frame having the same frame length as the data frame, the data frame is determined not to be the retransmission frame. According to embodiments of the present disclosure, the target frame is searched for based on the frame length and further whether the data frame is a retransmission frame is determined. In this manner, a retransmission frame can be conveniently determined. According to embodiments of the present disclosure, in a case where the HARQ-related field further includes the HARQ process identifier, in the process of searching for a data frame having a same frame length as the received data frame, the data frame having the same frame length as the received data frame may be searched for in a storage area corresponding to the HARQ process identifier. In this manner, the search speed can be improved and the search efficiency can be improved.

According to embodiments of the present disclosure, the "storage area corresponding to the HARQ process identifier" may represent a storage location corresponding to the HARQ process identifier. The storage location may be a storage location in a cache or a storage location in other memories.

In a case where indirectly indicating whether the data frame is the retransmission frame according to whether the receiver is able to find the target frame of the data frame is adopted for the retransmission indication field, the target frame may also be searched for based on at least one of the HARQ process identifier or the frame number and whether the data frame is a retransmission frame is further determined based on the search result according to embodiments of the present disclosure. Specifically, in a case where the HARQ-related field further includes at least one of the HARQ process identifier or the frame number, the step in which the receiver determines whether the data frame is a retransmission frame may include the following: in a case where the HARQ-related field includes both the HARQ process identifier and the frame number, the receiver searches for a data frame having a frame number which is same as the frame number in a storage area corresponding to the HARQ process identifier; if the data frame having a frame number which is the same as the frame number is found (the found data frame is the target frame), it is determined that the received data frame is a retransmission frame; if no data frame having a frame number which is the same as the frame number is found (that is, the target frame is not found), it is determined that the received data frame is not a retransmission frame.

In a case where the HARQ-related field merely includes the HARQ process identifier, the receiver may search for a data frame having a same frame length as the received data frame in a storage area corresponding to the HARQ process identifier; if the data frame having a same frame length as the received data frame is found (the found data frame is the target frame), it is determined that the received data frame is a retransmission frame; if no data frame having a same frame length as the received data frame is found (that is, the target frame is not found), it is determined that the received data frame is not a retransmission frame.

In a case where the HARQ-related field merely includes the frame number, the receiver searches for a data frame having a frame number which is the same as the frame number in a storage area; if the data frame having a frame number which is the same as the frame number is found (the found data frame is the target frame), it is determined that the received data frame is a retransmission frame; if no data frame having a frame number which is the same as the frame number is found (that is, the target frame is not found), it is determined that the received data frame is not a retransmission frame.

According to embodiments of the present disclosure, whether the data frame is a retransmission frame is determined based on at least one of the HARQ process identifier or the frame number. Such manner has a high accuracy and no additional bit is required to indicate whether the data frame is a retransmission frame. Therefore, the communications overhead can be saved.

According to embodiments of the present disclosure, the step 220 in which the receiver processes the data frame according to the HARQ-related field may further include the following: when the data frame is not a retransmission frame, the HARQ-related field in the data frame is skipped and the remaining part in the data frame other than the HARQ-related field continues to be processed (for example, decoded); and the data frame is stored when the remaining part in the data frame is not correctly processed (for example, decoded). According to the method for processing a data frame in embodiments of the present disclosure, when the data frame is not a retransmission frame, the HARQ-related field in the data frame may be skipped and the remaining part in the data frame other than the HARQ-related field continues to be processed (for example, decoded). Thus, the processing (for example, decoding) speed can be improved. Meanwhile, when the processing (for example, decoding) is not correct, the data frame can be stored for use when necessary.

According to embodiments of the present disclosure, the step 220 in which the receiver processes the data frame according to the HARQ-related field may further include the following: when the data frame is a retransmission frame, the receiver acquires the combining manner of the data frame and a data frame to be combined (that is, a target frame); the receiver combines the data frame and the data frame to be combined (that is, the target frame) in the acquired combining manner; the receiver decodes the combined result; if the decoding is correct, the receiver may decide whether to reply to the sender (for example, feedback acknowledgement) according to the actual implementation; if the decoding is incorrect, the receiver stores the combined result and/or the data frame and decides whether to reply to the sender according to the actual implementation. According to the method for processing a data frame in embodiments of the present disclosure, the retransmission frame may be combined with the data frame that was previously decoded incorrectly and the combined result can be processed. In this manner, a proper data frame processing method based on the HARQ is provided, which can reduce the delay of data frame transmission and improve the channel utilization rate and communications efficiency.

According to embodiments of the present disclosure, the HARQ-related field further includes a combining manner indication field, and the receiver acquiring the combining manner of a data frame may include the following: the receiver acquires the combining manner indication field by analyzing the data frame, and the receiver acquires the combining manner of the data frame through the combining manner indication field. The combining manner indication field indicates chase combine or incremental redundancy. The combining manner indication field may be an explicit representation of using a bit to improve the decoding speed. According to embodiments of the present disclosure, it may also be set that the data frame is combined in a certain combining manner by default in order to save the communications overhead. According to embodiments of the present disclosure, the combining manner of the data frame may be indicated through the combining manner indication field, so that fast combining and decoding of the data frame can be achieved.

According to embodiments of the present disclosure, an explicit representation using at least one bit is adopted for the combining manner indication field; the at least one bit forms a redundancy version identifier when the combining manner indication field indicates incremental redundancy. In this case, the redundancy version may be indicated by a numerical value of the bit indicating the combining manner.

According to embodiments of the present disclosure, the redundancy version identifier may not be required when the combining manner is chase combine.

According to embodiments of the present disclosure, the HARQ-related field may further include at least one of the HARQ process identifier or the frame number. The process in which the receiver acquires the target frame may specifically be the following: in a case where the HARQ-related field includes both the HARQ process identifier and the frame number, the receiver searches for a data frame having a frame number which is the same as the frame number in a storage area corresponding to the HARQ process identifier and uses the found data frame as the target frame; in a case where the HARQ-related field merely includes the HARQ process identifier, the receiver searches for a data frame having a same frame length as the received data frame in a storage area corresponding to the HARQ process identifier and uses the found data frame as the target frame; and in a case where the HARQ-related field merely includes the frame number, the receiver searches for a data frame having a frame number which is the same as the frame number in a storage area and uses the found data frame as the target frame.

According to embodiments of the present disclosure, the target frame can be acquired in various manners, so that the data frame to be combined can be acquired in various situations, thus better meeting the needs in various environments.

According to embodiments of the present disclosure, the representation manner of the HARQ indication field includes an explicit representation and an implicit representation. The explicit representation refers to determining, through the bit of the HARQ indication field in the data frame, whether the data frame is required to be processed according to the HARQ process. The implicit representation refers to indirectly indicating whether the data frame is required to be processed according to the HARQ process through whether a modulation scheme of one or more data blocks in the data frame is different from a preset modulation scheme of the one or more data blocks. The step 220 in which the receiver processes the data frame according to the HARQ-related field may further include the following: the receiver acquires the HARQ indication field through decoding; and the receiver determines, based on the HARQ indication field, whether the data frame is required to be processed according to the HARQ process. According to embodiments of the present disclosure, whether a data frame is required to be processed according to the HARQ process can be conveniently determined based on the HARQ indication field.

According to embodiments of the present disclosure, the implicit representation of indirectly indicating whether the data frame is required to be processed according to the HARQ process through whether a modulation scheme of one or more data blocks in the data frame is different from a preset modulation scheme of the one or more data blocks is used for the HARQ indication field. In this case, the step in which the receiver determines, based on the HARQ indication field, whether the data frame is required to be processed according to the HARQ process may include the following: the receiver obtains the modulation scheme of one or more designated data blocks; if the modulation scheme of the one or more data blocks is a preset modulation scheme corresponding to the HARQ indication, the data frame is required to be processed according to the HARQ process. For example, if the HARQ indication field indicates that the second data block is adjusted by using a BPSK scheme, and if the modulation scheme of the second data block of the received data frame is the BPSK scheme (that is, the modulation schemes of the two are the same and have no difference), it can be determined that the received data frame is required to be processed according to the HARQ process. For example, if the HARQ indication field indicates that the second data block and the third data block (or the fifth data block) are adjusted by using a BPSK scheme, and if the modulation schemes of the second data block and the third data block of the received data frame are not the BPSK scheme (that is, the modulation schemes of the two are different and have a difference), it can be determined that the received data frame is not required to be processed according to the HARQ process. According to embodiments of the present disclosure, it is determined, based on the modulation scheme, whether the data frame is required to be processed according to the HARQ process, so that no additional bit is required to indicate whether the data frame is required to be processed according to the HARQ process, thus saving the communications overhead.

Figure 3:
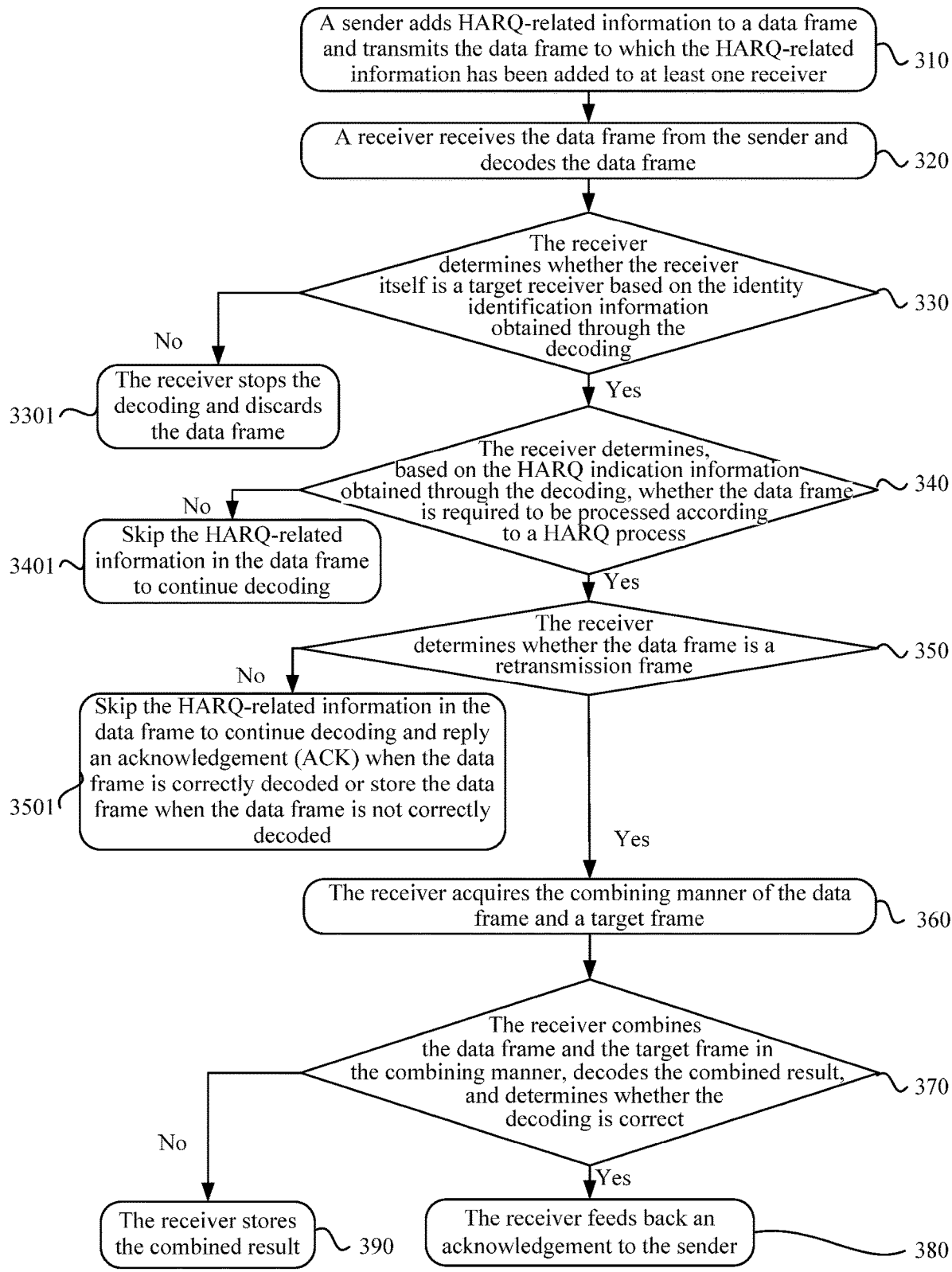
FIG. 3 is a detailed flowchart of a method for transmitting a data frame according to an embodiment of the present disclosure.

FIG. 3 is a detailed flowchart of a method for transmitting a data frame according to an embodiment of the present disclosure. Referring to FIG. 3, the method for transmitting a data frame according to the embodiment of the present disclosure may include steps 310 to 390.

In step 310, a sender adds a HARQ-related field to a data frame and transmits the data frame with the added HARQ-related field to at least one receiver.

The HARQ-related field includes a HARQ indication field and an identity identification field and may further include a retransmission indication field, a combining manner indication field, a redundancy version identifier, a HARQ process identifier and a frame number.

In step 320, a receiver receives the data frame from the sender and decodes the data frame.

In step 330, the receiver determines whether the receiver itself is a target receiver based on the identity identification field obtained through the decoding. When the receiver itself is not the target receiver, step 3301 is performed; when the receiver itself is the target receiver, step 340 is performed.

In step 3301, the receiver stops the decoding and discards the data frame.

In step 340, the receiver determines, based on the HARQ indication field obtained through the decoding, whether the data frame is required to be processed according to a HARQ process. When processing according to the HARQ process is not required, step 3401 is performed; when processing according to the HARQ process is required, step 350 is performed.

In step 3401, the receiver skips the HARQ-related field in the data frame to continue decoding.

In step 350, the receiver determines whether the data frame is a retransmission frame. When the data frame is not a retransmission frame, step 3501 is performed; when the data frame is a retransmission frame, step 360 is performed. How to determine the retransmission frame has been described with reference to FIGS. 1 and 2 and will not be repeated here.

In step 3501, the receiver skips the HARQ-related field in the data frame to continue decoding and replies an acknowledgement (ACK) to the sender when the data frame is correctly decoded or stores the data frame when the data frame is not correctly decoded.

In step 360, the receiver acquires the combining manner of the data frame and a target frame. How to acquire the combining manner of the data frame and the target frame has been described with reference to FIGS. 1 and 2 and will not be repeated here.

In step 370, the receiver combines the data frame and the target frame in the acquired combining manner, decodes the combined result, and determines whether the decoding is correct. If the decoding is correct, step 380 is performed; if the decoding is incorrect, step 390 is performed.

In step 380, the receiver feeds back an acknowledgement to the sender.

In step 390, the receiver stores the combined result.

It is to be understood that the execution sequence shown in FIG. 3 is merely an example and is not for limitation. According to embodiments of the present disclosure, the execution sequence of some steps may be adjusted as required. For example, it can be first determined whether the data frame is required to be processed according to the HARQ process, and then it is determined whether the receiver itself is the target receiver, and the like.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. Meanwhile, according to embodiments of the present disclosure, the HARQ mechanism is introduced into the data frame processing in the wireless local area network. The efficiency of data transmission in the wireless local area network can be greatly improved. In addition, various HARQ-related fields are carried in the data frame so that data combining, storage and transmission based on the HARQ can be achieved properly.

The method for transmitting a data frame provided in embodiments of the present disclosure is further described below through some embodiments. For convenience of description, the sender is referred to as an AP and the receiver is referred to as an STA below. It is to be clear that the solutions described in the present disclosure are not limited to downlink data transmission and are also applicable to uplink data transmission.

For convenience of description, the HARQ-related field is placed in SIG-C of the data frame herein. It is to be understood that various fields transmitted by the sender may be expressed explicitly or implicitly and may also be distributed in other fields of the preamble.

Table 1 shows a format of a data frame sent by the AP. Table 1 is merely an example, and the present disclosure is not limited thereto.

TABLE 1

| Short training field | ... SIG | ... SIG-C | ... XX-long training field | ... Payload |

It is assumed that both the sender and the receiver can maintain multiple HARQ processes. The format of the data frame sent by the AP is shown in Table 1, and the AP adds the HARQ-related field to the SIG-C field shown in Table 1. The SIG-C field may adopt, for example, 1/2 code rate, binary convolutional coding (BCC) and BPSK modulation.

The HARQ-related field may include at least one of an identity identification field, a HARQ indication field, a retransmission indication field, a combining manner indication field, a redundancy version identifier, a HARQ process identifier or a frame number.

One possible field structure for the SIG-C is shown in Table 2.

TABLE 2

| B0 | B1 | B2-B5 | B6 | B7-B14 | B15-B17 | B18 | B19-B23 |
|---|---|---|---|---|---|---|---|
| HARQ | Retry | RV | Reserve | MAC Address | Process ID | Reserve | Frame Number |
| 1 | 1 | 4 | 1 | 8 | 3 | 1 | 5 |

The meaning of each field in Table 2 may be that shown in Table 3.

TABLE 3

| Field | Number of bits | Description of the meaning |
|---|---|---|
| HARQ | 1 | Being set to 0 indicates that the data frame requires a HARQ operation; being set to 1 indicates that the data frame does not require a HARQ operation |
| Retry | 1 | Being set to 0 indicates that the data frame is a retransmission frame; being set to 1 indicates that the data frame is not a retransmission frame |
| RV | 4 | Used to describe a combining method and/or a redundancy version, where 0 or 15 indicates that the data frame is combined by CC, in which case no redundancy version is involved; and {1, 2, 3, . . . , 14} indicates that IR is adopted, and a specific value indicates a redundancy version number |
| Reserve | 1 | Reserve bit set to 1 |
| MAC Address | 8 | Last eight bits of the MAC address of the target receiver of the data frame, for example, MAC address [40:47] (According to embodiments of the present disclosure, the association identifier of the target receiver, calculated value related to the association identifier, packet identifier, BSS identifier, MAC address, calculated value related to the MAC address, or any combination thereof may also be used) |
| HARQ Process ID | 3 | Being set to 0 refers to that the HARQ process identifier (ID) for sending the data frame is 1<br>Being set to 1 refers to that the HARQ process ID for sending the data frame is 2<br>Being set to 2 refers to that the HARQ process ID for sending the data frame is 3<br>Being set to 3 refers to that the HARQ process ID for sending the data frame is 4<br>Being set to 4 refers to that the HARQ process ID for sending the data frame is 5<br>Being set to 5 refers to that the HARQ process ID for sending the data frame is 6<br>Being set to 6 refers to that the HARQ process ID for sending the data frame is 7<br>Being set to 7 refers to that the HARQ process ID for sending the data frame is 8 |
| Reserve | 1 | Reserve bit set to 1 |
| Frame Number | 5 | Frame number field |

One possible type of bits of the SIG-C according to Table 2 and Table 3 may be as shown in Table 4.

TABLE 4

| B0 | B1 | B2 | B3 | B4 | B5 | B6 | B7 | B8 | B9 | B10 | B11 |
|---|---|---|---|---|---|---|---|---|---|---|---|
| 0 | 0 | 0 | 0 | 0 | 0 | 1 | 0 | 0 | 1 | 0 | 1 |
| B12 | B13 | B14 | B15 | B16 | B17 | B18 | B19 | B20 | B21 | B22 | B23 |
| 0 | 1 | 0 | 0 | 0 | 1 | 1 | 0 | 1 | 0 | 0 | 1 |

In the case shown in Table 4, the processing process of the receiver after the data frame with the SIG-C shown in Table 4 is received may be as described below.

It is assumed that STA1 receives a data frame and that the last eight bits of the MAC address of STA1 are [0 0 1 0 1 1 1 1]. STA1 decodes the data frame in sequence, and until the SIG-C field, the operation of STA1 is as follows: STA1 decodes bit B0 to be 0 and processes the data frame according to the HARQ process; STA1 decodes bit B7 to B14 to be [0 0 1 0 1 0 1 0], and the data value is compared with and found to be different from the last 8 bits of the MAC address of STA1 itself; STA1 stops the decoding and discards the data frame.

It is assumed that STA2 receives the data frame and that the last eight bits of the MAC address of STA2 are [0 0 1 0 1 0 1 0]. STA2 decodes the data frame in sequence, and until the SIG-C field, the operation of STA2 is as follows: STA2 decodes bit B0 to be 0 and processes the data frame according to the HARQ process; STA2 decodes bit B7 to bit B14 to be [0 0 1 0 1 0 1 0], and the data value is compared with and found to be the same as the last eight bits of the MAC address of STA2 itself; STA2 continues the decoding. STA2 decodes bit B1 to be 0 and determines that the data frame is a retransmission frame. STA2 decodes bit B2 to bit B5 to be [0 0 0 0] and determines that the data frame is combined in a CC manner. STA2 decodes bit B15 to bit B17 to be [0 0 1] and bit B19 to bit B23 to be [0 1 0 0 1]. SAT2 searches for a data frame having a frame number of [0 1 0 0 1] in a cache area corresponding to a process whose HARQ process identifier is 2, combines the data frame with the currently received data frame in the CC manner and decodes the combined result. If STA2 performs decoding correctly, an ACK is replied to the AP. If the decoding is wrong, a NACK is replied to the AP (or no reply is made and the specific form depends on the pre-negotiated rule and specific implementation), and the combined result is stored according to the HARQ process identifier.

One possible type of bits of the SIG-C according to Table 2 and Table 3 may be as shown in Table 5.

In the case shown in Table 5, the processing process of the receiver after the data frame with the SIG-C shown in Table 5 is received may be as described below.

It is assumed that STA2 receives the data frame and that the last eight bits of the MAC address of STA2 are [0 0 1 0 1 0 1 0]. STA2 decodes the data frame in sequence, and until the SIG-C field, the operation of STA2 may be as follows: STA2 decodes bit B0 to be 0 and determines that the data frame is processed according to the HARQ process; STA2 decodes bit B7 to bit B14 to be [0 0 1 0 1 0 1 0], and the data value is compared with and found to be the same as the last eight bits of the MAC address of STA2 itself; STA2 continues the decoding. STA2 decodes bit B1 to be 0 and determines that the data frame is a retransmission frame. STA2 decodes bit B2 to bit B5 to be [0 10 1] and determines that the data frame is combined in an IR manner, and the redundancy version number of the data frame is 5. STA2 decodes bit B15 to bit B17 to be [0 0 1] and bit B19 to bit B23 to be [0 1 0 0 1]. SAT2 searches for a data frame having a frame number of [0 1 0 0 1] in a cache area corresponding to a process whose HARQ process identifier is 2, combines the data frame with the currently received data frame in the IR manner and decodes the combined result. If STA2 performs decoding correctly, an ACK is replied to the AP. If the decoding is wrong, a NACK is replied to the AP (or no reply is made and the specific form depends on the pre-negotiated rule and specific implementation), and the combined result is stored according to the HARQ process identifier.

One possible type of bits of the SIG-C according to Table 2 and Table 3 may be as shown in Table 6.

TABLE 5

| B0 | B1 | B2 | B3 | B4 | B5 | B6 | B7 | B8 | B9 | B10 | B11 |
|---|---|---|---|---|---|---|---|---|---|---|---|
| 0 | 0 | 0 | 1 | 0 | 1 | 1 | 0 | 0 | 1 | 0 | 1 |
| B12 | B13 | B14 | B15 | B16 | B17 | B18 | B19 | B20 | B21 | B22 | B23 |
| 0 | 1 | 0 | 0 | 0 | 1 | 1 | 0 | 1 | 0 | 0 | 1 |

TABLE 6

| B0 | B1 | B2 | B3 | B4 | B5 | B6 | B7 | B8 | B9 | B10 | B11 |
|---|---|---|---|---|---|---|---|---|---|---|---|
| 1 | 0 | 0 | 0 | 0 | 0 | 1 | 0 | 0 | 0 | 0 | 0 |
| B12 | B13 | B14 | B15 | B16 | B17 | B18 | B19 | B20 | B21 | B22 | B23 |
| 0 | 0 | 0 | 0 | 0 | 0 | 1 | 0 | 1 | 0 | 0 | 0 |

In the case shown in Table 6, the processing process of the receiver after the data frame with the SIG-C shown in Table 6 is received may be as described below.

It is assumed that STA2 receives the data frame and that the last eight bits of the MAC address of STA2 are [0 0 1 0 1 0 1 0]. STA2 decodes the data frame in sequence, and until the SIG-C field, the operation of STA2 is as follows: STA2 decodes bit B0 to be 1 and determines that the data frame is not processed according to the HARQ process, the SIG-C is skipped and the subsequent content of the SIG-C in the data frame is directly decoded; if STA2 correctly decodes the data frame, an ACK is replied; if STA2 does not decode the data frame correctly, no reply is made and the data frame is discarded.

One possible type of bits of the SIG-C according to Table 2 and Table 3 may be as shown in Table 7.

TABLE 7

| B0 | B1 | B2 | B3 | B4 | B5 | B6 | B7 | B8 | B9 | B10 | B11 |
|---|---|---|---|---|---|---|---|---|---|---|---|
| 0 | 1 | 0 | 0 | 0 | 0 | 1 | 0 | 0 | 1 | 0 | 1 |
| B12 | B13 | B14 | B15 | B16 | B17 | B18 | B19 | B20 | B21 | B22 | B23 |
| 0 | 1 | 0 | 0 | 0 | 1 | 1 | 0 | 1 | 0 | 0 | 0 |

In the case shown in Table 7, the processing process of the receiver after the data frame with the SIG-C shown in Table 7 is received may be as described below.

It is assumed that STA2 receives the data frame and that the last eight bits of the MAC address of STA2 are [0 0 1 0 1 0 1 0]. STA2 decodes the data frame in sequence, and until the SIG-C field, the operation of STA2 is as follows: STA2 decodes bit B0 to be 0 and processes the data frame according to the HARQ process; STA2 decodes bit B7 to bit B14 to be [0 0 1 0 1 0 1 0], and the data value is compared with and found to be the same as the last eight bits of the MAC address of STA2 itself; STA2 continues the decoding. STA2 decodes bit B1 to be 1 and determines that the data frame is not a retransmission frame. STA2 decodes B15 to B17 to be [0 0 1] which is recorded, skips the SIG-C, and continues to decode the subsequent content. If STA2 correctly decodes the data frame, an ACK is replied; if STA2 does not decode the data frame correctly, the data frame is stored according to the HARQ process identifier.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. Meanwhile, according to embodiments of the present disclosure, the HARQ mechanism is introduced into the data frame processing in the wireless local area network. The efficiency of data transmission in the wireless local area network can be greatly improved.

According to embodiments of the present disclosure, some fields are added so that data transmission based on the HARQ mechanism can be achieved in a wireless local area network system.

It is assumed that both the sender and the receiver can maintain multiple HARQ processes. The data frame format of the data frame sent by the AP is shown in Table 1. A HARQ-related field is added to the SIG-C field shown in Table 1. The SIG-C field adopts, for example, 1/2 code rate, BCC coding and BPSK modulation.

The HARQ-related field may include an identity identification field, a HARQ indication field, a combining manner indication field, a redundancy version identifier, a HARQ process identifier and a frame number without including a retransmission indication field.

Table 8 shows a possible field structure of the SIG-C.

TABLE 8

| B0 | B1 | B2-B5 | B6 | B7-B14 | B15-B17 | B18 | B19-B23 |
|---|---|---|---|---|---|---|---|
| HARQ | Reserve | RV | Reserve | MAC Address | Process ID | Reserve | Frame Number |
| 1 | 1 | 4 | 1 | 8 | 3 | 1 | 5 |

For the meaning of each subfield in Table 8, reference may be made to Table 3 above.

The details are not repeated here.

One possible type of bits of the SIG-C according to Table 3 and Table 8 may be as shown in Table 9.

TABLE 9

| B0 | B1 | B2 | B3 | B4 | B5 | B6 | B7 | B8 | B9 | B10 | B11 |
|---|---|---|---|---|---|---|---|---|---|---|---|
| 0 | 0 | 0 | 0 | 0 | 0 | 1 | 0 | 0 | 1 | 0 | 1 |

TABLE 9-continued

| B12 | B13 | B14 | B15 | B16 | B17 | B18 | B19 | B20 | B21 | B22 | B23 |
|---|---|---|---|---|---|---|---|---|---|---|---|
| 0 | 1 | 0 | 0 | 0 | 1 | 1 | 0 | 1 | 0 | 0 | 1 |

In the case shown in Table 9, the processing process of the receiver after the data frame with the SIG-C shown in Table 9 is received may be as described below.

It is assumed that STA2 receives the data frame and that the last eight bits of the MAC address of STA2 are [0 0 1 0 1 0 1 0]. STA2 decodes the data frame in sequence, and until the SIG-C field, the operation of STA2 may be as follows: (1) STA2 decodes bit B0 to be 0 and processes the data frame according to the HARQ process; (2) STA2 decodes bit B7 to bit B14 to be [0 0 1 0 1 0 1 0], and the data value is compared with and found to be the same as the last eight bits of the MAC address of STA2 itself; STA2 continues the decoding. (3) STA2 decodes bit B15 to bit B17 to be [0 0 1] and bit B19 to bit B23 to be [0 1 0 1 1]. Then, STA2 searches for whether a data frame having a frame number of [0 1 0 1 1] exists in the cache area corresponding to the process whose HARQ process identifier is 2. If such data frame exists, the data frame currently received by STA2 is a retransmission frame; if such data frame does not exist, the data frame currently received by STA2 is a first transmission frame. It is assumed that a data frame having the same frame number as the data frame currently received by STA2 exists locally in STA2. (4) STA2 decodes bit B2 to bit B5 to be [0 0 0 0], determines that the data frame is combined in a CC manner, and combines the data frame with the data frame having the same frame number and stored locally. (5) The combined result is decoded. If STA2 performs decoding correctly, an ACK is replied to the AP; if the decoding is wrong, a NACK is replied to the AP ((or no reply is made and the specific form depends on the pre-negotiated rule and specific implementation), and the combined result is stored according to the HARQ process identifier.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

According to embodiments of the present disclosure, some fields are added so that data transmission based on the HARQ mechanism can be achieved in a wireless local area network system.

It is assumed that both the sender and the receiver can maintain multiple HARQ processes. The format of the data frame sent by the AP is shown in Table 1, and the HARQ-related field is added to the SIG-C field shown in Table 1. The SIG-C field may adopt, for example, 1/2 code rate, binary convolutional coding (BCC) and BPSK modulation.

The HARQ-related field may include an identity identification field, a HARQ indication field, a redundancy version identifier, a HARQ process identifier and a frame number without including a retransmission indication field.

The predefined data frame is combined in the IR manner. In this case, a possible field structure of the SIG-C is shown in Table 10.

TABLE 10

| B0 | B1 | B2-B5 | B6 | B7-B14 | B15-B17 | B18 | B19-B23 |
|---|---|---|---|---|---|---|---|
| HARQ | Reserve | RV | Reserve | MAC Address | Process ID | Reserve | Frame Number |
| 1 | 1 | 4 | 1 | 8 | 3 | 1 | 5 |

The meaning of each field in Table 10 may be that shown in Table 11.

TABLE 11

| Field | Number of bits | Description of the meaning |
|---|---|---|
| HARQ | 1 | Being set to 0 indicates that the data frame requires a HARQ operation; being set to 1 indicates that the data frame does not require a HARQ operation |
| Reserve | 1 | Reserve bit set to 1 |
| RV | 4 | Indicating the redundancy version used during combining, and {0, 1, 2, 3, . . . , 15} indicating a redundancy version number |
| Reserve | 1 | Reserve bit set to 1 |
| MAC Address | 8 | Last eight bits of the MAC address of the transmission target of the data frame, that is, MAC address [40:47] (According to embodiments of the present disclosure, the association identifier of the target receiver, calculated value related to the association identifier, packet identifier, BSS identifier, MAC address, calculated value related to the MAC address, or any combination thereof may be used) |
| HARQ Process ID | 3 | Being set to 0 refers to that the HARQ process ID for sending the data frame is 1<br>Being set to 1 refers to that the HARQ process ID for sending the data frame is 2<br>Being set to 2 refers to that the HARQ process ID for sending the data frame is 3<br>Being set to 3 refers to that the HARQ process ID for sending the data frame is 4<br>Being set to 4 refers to that the HARQ process ID for sending the data frame is 5<br>Being set to 5 refers to that the HARQ process ID for sending the data frame is 6<br>Being set to 6 refers to that the HARQ process ID for sending the data frame is 7<br>Being set to 7 refers to that the HARQ process ID for sending the data frame is 8 |
| Reserve | 1 | Reserve bit set to 1 |
| Frame Number | 5 | Frame number field |

One possible type of bits of the SIG-C according to Table 10 and Table 11 may be as shown in Table 12.

TABLE 12

| B0 | B1 | B2 | B3 | B4 | B5 | B6 | B7 | B8 | B9 | B10 | B11 |
|----|----|----|----|----|----|----|----|----|----|-----|-----|
| 0  | 0  | 0  | 1  | 0  | 1  | 1  | 0  | 0  | 1  | 0   | 1   |

| B12 | B13 | B14 | B15 | B16 | B17 | B18 | B19 | B20 | B21 | B22 | B23 |
|-----|-----|-----|-----|-----|-----|-----|-----|-----|-----|-----|-----|
| 0   | 1   | 0   | 0   | 0   | 1   | 1   | 0   | 1   | 0   | 0   | 1   |

In the case shown in Table 12, the processing process of the receiver after the data frame is received may be as described below.

It is assumed that STA2 receives the data frame and that the last eight bits of the MAC address of STA2 are [0 0 1 0 1 0 1 0]. STA2 decodes the data frame in sequence, and until the SIG-C field, the operation of STA2 may be as follows: STA2 decodes bit B0 to be 0 and processes the data frame according to the HARQ process; STA2 decodes bit B7 to bit B14 to be [0 0 1 0 1 0 1 0], and the data value is compared with and found to be the same as the last eight bits of the MAC address of STA2 itself; STA2 continues the decoding. STA2 decodes bit B15 to bit B17 to be [0 0 1] and bit B19 to bit B23 to be [0 1 0 0 1]. Then, STA2 searches for whether a data frame having a frame number of [0 1 0 0 1] exists in the cache area corresponding to the process whose HARQ process identifier is 2. If such data frame exists, the data frame currently received by STA2 is a retransmission frame; if such data frame does not exist, the data frame currently received by STA2 is a first transmission frame. In this embodiment, it is assumed that a data frame having the same frame number as the data frame currently received by STA2 exists locally in STA2. STA2 decodes bit B2 to bit B5 to be [0 1 0 1] which indicates that the redundancy version number of the data frame is 5 and combines the data frame with the data frame having the same frame number and stored locally in an IR manner. The combined result is decoded. If STA2 performs decoding correctly, an ACK is replied to the AP; if the decoding is wrong, a NACK is replied to the AP ((or no reply is made and the specific form depends on the pre-negotiated rule and specific implementation), and the combined result is stored according to the HARQ process identifier.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

According to embodiments of the present disclosure, the HARQ mechanism can be implemented in a wireless local area network system with less overhead through predefinition and implicit indication of some fields.

It is assumed that both the sender and the receiver can maintain multiple HARQ processes. The data frame format of the data frame sent by the AP is shown in Table 1. A HARQ-related field is added to the SIG-C field shown in Table 1. The SIG-C field adopts, for example, 1/2 code rate, BCC coding and BPSK modulation.

The HARQ-related field includes an identity identification field, a HARQ indication field, a HARQ process identifier and a frame number and does not include a retransmission indication field, a combining manner indication field or a redundancy version identifier.

The predefined data frame is combined in the CC manner. In this case, a possible field structure of the SIG-C is shown in Table 13.

TABLE 13

| B0 | B1-B8 | B9-B11 | B12 | B13-B17 |
|----|-------|--------|-----|---------|
| HARQ | MAC Address | Process ID | Reserve | Frame Number |
| 1 | 8 | 3 | 1 | 5 |

The meaning of each subfield in Table 10 may be that shown in Table 14.

TABLE 14

| Field | Number of bits | Description of the meaning |
|-------|----------------|----------------------------|
| HARQ | 1 | Being set to 0 indicates that the data frame requires a HARQ operation; being set to 1 indicates that the data frame does not require a HARQ operation |
| MAC Address | 8 | Last eight bits of the MAC address of the transmission target of the data frame, for example, MAC address [40:47] (According to embodiments of the present disclosure, the association identifier of the target receiver, calculated value related to the association identifier, packet identifier, BSS identifier, MAC address, calculated value related to the MAC address, or any combination thereof may be used) |
| HARQ Process ID | 3 | Being set to 0 refers to that the HARQ process ID for sending the data frame is 1<br>Being set to 1 refers to that the HARQ process ID for sending the data frame is 2<br>Being set to 2 refers to that the HARQ process ID for sending the data frame is 3<br>Being set to 3 refers to that the HARQ process ID for sending the data frame is 4 |

TABLE 14-continued

| Field | Number of bits | Description of the meaning |
|---|---|---|
| | | Being set to 4 refers to that the HARQ process ID for sending the data frame is 5 |
| | | Being set to 5 refers to that the HARQ process ID for sending the data frame is 6 |
| | | Being set to 6 refers to that the HARQ process ID for sending the data frame is 7 |
| | | Being set to 7 refers to that the HARQ process ID for sending the data frame is 8 |
| Reserve | 1 | Reserve bit set to 1 |
| Frame Number | 5 | Frame number field |

One possible type of bits of the SIG-C according to Table 13 and Table 14 may be as shown in Table 15.

TABLE 15

| B0 | B1 | B2 | B3 | B4 | B5 | B6 | B7 | B8 |
|---|---|---|---|---|---|---|---|---|
| 0 | 0 | 0 | 1 | 0 | 1 | 0 | 1 | 0 |

| B9 | B10 | B11 | B12 | B13 | B14 | B15 | B16 | B17 |
|---|---|---|---|---|---|---|---|---|
| 0 | 0 | 1 | 1 | 0 | 1 | 0 | 0 | 1 |

In the case shown in Table 15, the processing process of the receiver after the data frame is received may be as described below.

It is assumed that STA2 receives the data frame and that the last eight bits of the MAC address of STA2 are [0 0 1 0 1 0 1 0]. STA2 decodes the data frame in sequence, and until the SIG-C field, the operation of STA2 is as follows: STA2 decodes bit B0 to be 0 and processes the data frame according to the HARQ process; STA2 decodes bit B1 to bit B8 to be [0 0 1 0 1 0 1 0], and the data value is compared with and found to be the same as the last eight bits of the MAC address of STA2 itself; STA2 continues the decoding. STA2 decodes bit B9 to bit B11 to be [0 0 1] and bit B13 to bit B17 to be [0 1 0 0 1]. Then, STA2 searches for whether a data frame having a frame number of [0 1 0 0 1] exists in the cache area corresponding to the process whose HARQ process identifier is 2. If such data frame exists, the data frame currently received by STA2 is a retransmission frame; if such data frame does not exist, the data frame currently received by STA2 is a first transmission frame. It is assumed that a data frame having the same frame number as the data frame currently received by STA2 exists locally in STA2. Since the predefined manner of CC is adopted for combining, the data frame currently received by STA2 is combined with the data frame having the same frame number and stored locally in the CC manner. The combined result is decoded. If STA2 performs decoding correctly, an ACK is replied to the AP; if the decoding is wrong, a NACK is replied to the AP ((or no reply is made and the specific form depends on the pre-negotiated rule and specific implementation), and the combined result is stored according to the HARQ process identifier.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

According to embodiments of the present disclosure, the HARQ mechanism can be implemented in a wireless local area network system with less overhead through predefinition and implicit indication of some fields.

It is assumed that the sender may maintain multiple HARQ processes, while each receiver may maintain merely one HARQ process. The format of the data frame sent by the AP is shown in Table 1, and the HARQ-related field is added to the SIG-C field shown in Table 1. The SIG-C field may adopt, for example, 1/2 code rate, binary convolutional coding (BCC) and BPSK modulation.

The HARQ-related field may include an identity identification field, a HARQ indication field, a combining manner indication field, a redundancy version identifier and a HARQ process identifier and does not include a retransmission indication field or a frame number.

One possible field structure for the SIG-C is shown in Table 16.

TABLE 16

| B0 | B1 | B2-B5 | B6 | B7-B14 | B15-B17 | B18 |
|---|---|---|---|---|---|---|
| HARQ | Reserve | RV | Reserve | MAC Address | Process ID | Reserve |
| 1 | 1 | 4 | 1 | 8 | 3 | 1 |

The meaning of each field in Table 16 may be that shown in Table 17.

TABLE 17

| Field | Number of bits | Description of the meaning |
|---|---|---|
| HARQ | 1 | Being set to 0 indicates that the data frame requires a HARQ operation; being set to 1 indicates that the data frame does not require a HARQ operation |

TABLE 17-continued

| Field | Number of bits | Description of the meaning |
|---|---|---|
| Reserve | 1 | Reserve bit set to 1 |
| RV | 4 | Used to describe a combining method or a redundancy version, where 0 or 15 indicates that the data frame is combined by CC; and {1, 2, 3, . . . , 14} indicates that IR is adopted, and a specific value indicates a redundancy version number |
| Reserve | 1 | Reserve bit set to 1 |
| MAC Address | 8 | Last eight bits of the MAC address of the transmission target of the data frame, that is, MAC address [40:47] (According to embodiments of the present disclosure, the association identifier of the target receiver, calculated value related to the association identifier, packet identifier, BSS identifier, MAC address, calculated value related to the MAC address, or any combination thereof may be used) |
| HARQ Process ID | 3 | Being set to 0 refers to that the HARQ process ID for sending the data frame is 1<br>Being set to 1 refers to that the HARQ process ID for sending the data frame is 2<br>Being set to 2 refers to that the HARQ process ID for sending the data frame is 3<br>Being set to 3 refers to that the HARQ process ID for sending the data frame is 4<br>Being set to 4 refers to that the HARQ process ID for sending the data frame is 5<br>Being set to 5 refers to that the HARQ process ID for sending the data frame is 6<br>Being set to 6 refers to that the HARQ process ID for sending the data frame is 7<br>Being set to 7 refers to that the HARQ process ID for sending the data frame is 8 |
| Reserve | 1 | Reserve bit set to 1 |

One possible type of bits of the SIG-C according to Table 16 and Table 17 may be as shown in Table 18.

TABLE 18

| B0 | B1 | B2 | B3 | B4 | B5 | B6 | B7 | B8 | B9 |
|---|---|---|---|---|---|---|---|---|---|
| 0 | 1 | 0 | 1 | 0 | 1 | 1 | 0 | 0 | 1 |

| B10 | B11 | B12 | B13 | B14 | B15 | B16 | B17 | B18 |
|---|---|---|---|---|---|---|---|---|
| 0 | 1 | 0 | 1 | 0 | 0 | 0 | 1 | 1 |

In the case shown in Table 18, the processing process of the receiver after the data frame is received may be as described below. It is assumed that STA2 receives the data frame and that the last eight bits of the MAC address of STA2 are [0 0 1 0 1 0 1 0]. STA2 decodes the data frame in sequence, and until the SIG-C field, the operation of STA2 may be as follows: STA2 decodes bit B0 to be 0 and processes the data frame according to the HARQ process; STA2 decodes bit B7 to bit B14 to be [0 0 1 0 1 0 1 0], and the data value is compared with and found to be the same as the last eight bits of the MAC address of STA2 itself; STA2 continues the decoding. STA2 decodes bit B15 to bit B17 to be [0 0 1], records this value and compares whether the frame length of the currently received data frame is the same as the frame length of a locally cached data frame. If a local data frame has the same frame length as the data frame currently received by STA2, the data frame currently received by STA2 is a retransmission frame. If no data frame satisfying the condition is found, the data frame currently received by STA2 is a first transmission frame. It is assumed that a data frame having the same frame length as the data frame currently received by STA2 exists locally in STA2. STA2 decodes bit B2 to bit B5 to be [0 1 0 1] and determines that the data frame is combined in the IR manner. The currently received data frame has a redundancy version number of 5 and is combined with the data frame locally found previously. The combined result is decoded. If STA2 performs decoding correctly, an ACK is replied to the AP; if the decoding is wrong, a NACK is replied to the AP ((or no reply is made and the specific form depends on the pre-negotiated rule and specific implementation), and the combined result is stored according to the HARQ process identifier.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

According to embodiments of the present disclosure, it is convenient to determine whether the data frame is a retransmission frame through a comparison of the data frame lengths.

It is assumed that implicit representation based on a modulation scheme is adopted for the HARQ indication field. If the SIG-C field adopts 1/2 code rate and BCC coding and the modulation scheme of one or more designated data blocks is BPSK modulation, the current data frame is not subjected to the HARQ operation. If the SIG-C field adopts 1/2 code rate and BCC coding and the modulation scheme of one or more designated data blocks is Q-BPSK modulation, the current data frame requires the HARQ operation.

One possible field structure for the SIG-C is shown in Table 19.

TABLE 19

| B1 | B1-B4 | B5 | B6-B13 | B14-B16 | B17 | B18-B22 |
|---|---|---|---|---|---|---|
| Retry | RV | Reserve | MAC Address | Process ID | Reserve | Frame Number |
| 1 | 4 | 1 | 8 | 3 | 1 | 5 |

The meaning of each field in Table 19 may be that shown in Table 3.

The operation of the STA to receive the data frame is similar to the operations described with reference to Tables 2 to 7, that is, corresponding modifications are made according to different HARQ indication manners on the basis of the operations described with reference to Tables 2 to 7.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

According to embodiments of the present disclosure, some fields are added so that data transmission based on the HARQ mechanism can be achieved in a wireless local area network system.

It is assumed that implicit representation based on a modulation scheme is adopted for the retransmission indication field.

If the SIG-C field adopts 1/2 code rate and BCC coding and the modulation scheme of one or more designated data blocks is BPSK modulation, the current data frame is a first transmission frame. If the SIG-C field adopts 1/2 code rate and BCC coding and the modulation scheme of one or more designated data blocks is Q-BPSK modulation, the current data frame is a retransmission frame.

One possible field structure for the SIG-C is shown in Table 20.

TABLE 20

| B0 | B1-B4 | B5 | B6-B13 | B14-B16 | B17 | B18-B22 |
|---|---|---|---|---|---|---|
| HARQ | RV | Reserve | MAC Address | Process ID | Reserve | Frame Number |
| 1 | 4 | 1 | 8 | 3 | 1 | 5 |

The meaning of each subfield in Table 20 may be that shown in Table 3.

The operation of the STA to receive the data frame is similar to the operations described with reference to Tables 2 to 7, that is, corresponding modifications are made according to different retransmission indication manners on the basis of the operations described with reference to Tables 2 to 7.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

According to embodiments of the present disclosure, some fields are added so that data transmission based on the HARQ mechanism can be achieved in a wireless local area network system.

It is assumed that the sender may maintain multiple HARQ processes, while each receiver may maintain merely one HARQ process. The format of the data frame sent by the AP is shown in Table 1, and the HARQ-related field is added to the SIG-C field shown in Table 1.

The HARQ-related field may include an identity identification field and a HARQ indication field.

This HARQ-related field is a type used in a specific scenario. Such type can implement the HARQ process with minimal overhead. For example, after the sender sends the first transmission frame of a data frame, if the receiver receives the data frame incorrectly, the sender will continue to retransmit the data frame until the receiver correctly receives the data frame or the number of sending times reaches the preset number of retransmissions. If CC is preset for data combining at this time, the sender is merely required to add an identity identification field and a HARQ indication field to the SIG-C or other SIG fields of the data frame.

In this case, the operation process of the receiver may be as follows: the receiver determines whether the transmission target of the data frame is the receiver through the identity identification field, determines whether the data frame requires the HARQ operation through the HARQ indication field, and compares whether the frame length of the current data frame is the same as the frame length of the data frame stored locally by the receiver. If yes, the data frame currently received by the receiver is a retransmission frame and is combined with the data frame stored locally by the receiver in the CC manner. If no, the data frame currently received by the receiver is a first transmission frame and is not combined. The combined frame or the first transmission frame is decoded. If the decoding is correct, an ACK is replied. If the decoding is wrong, the receiver does not reply. If the sender receives the ACK replied by the receiver, the data frame is considered to have been received correctly. If no reply is received after a period of time, the sender considers that the data frame is accepted incorrectly and retransmits the data frame.

According to embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

Figure 4:
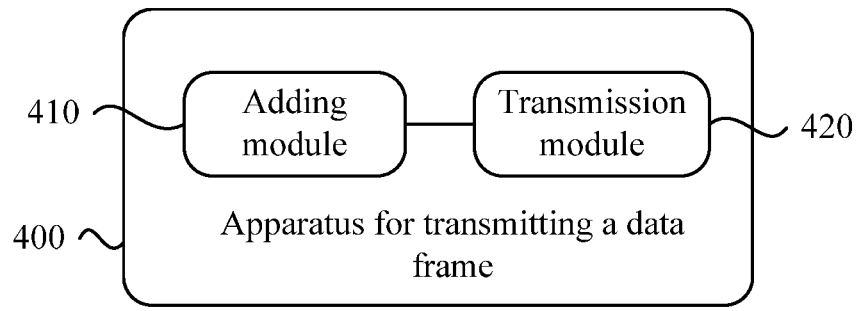
FIG. 4 is a block diagram illustrating a structure of an apparatus for transmitting a data frame according to an embodiment of the present disclosure.

FIG. 4 is a block diagram illustrating a structure of an apparatus for transmitting a data frame according to an embodiment of the present disclosure. Referring to FIG. 4, an apparatus 400 for transmitting a data frame according to the embodiment of the present disclosure may be a device on a sending side and may include an adding module 410 and a transmission module 420.

The adding module 410 is configured to add a hybrid automatic repeat request (HARQ)-related field into the data frame.

The transmission module 420 is configured to transmit the data frame with the added HARQ-related field to at least one receiver.

According to embodiments of the present disclosure, the HARQ-related field may include a HARQ indication field and an identity identification field, the HARQ indication field indicates whether the data frame is required to be processed according to a HARQ process, and the identity identification field indicates an identity identification of a target receiver of the data frame among the at least one receiver so as to determine the transmission target of the data frame.

According to embodiments of the present disclosure, the apparatus 400 and the at least one receiver may be in the same wireless local area network.

According to embodiments of the present disclosure, the apparatus for transmitting a data frame adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

According to embodiments of the present disclosure, the HARQ-related field further includes at least one of a retransmission indication field, a combining manner indication field, a redundancy version identifier, a HARQ process identifier or a frame number. The retransmission indication field indicates whether the data frame is a retransmission frame. The combining manner indication field is used for indicating the manner in which data frames are combined. The redundancy version identifier is used for indicating the redundancy version of the data frame. A redundancy version indication field is used for indicating a redundancy version of the data frame. The HARQ process identifier is an identifier indicating a HARQ process. The frame number is an identifier indicating information transmitted in the data frame, and information transmitted in data frames having a same frame number is the same.

According to embodiments of the present disclosure, one or more pieces of indication information included in the HARQ-related field are located in the same signaling message of the preamble of the data frame or in different signaling messages of the preamble of the data frame.

According to embodiments of the present disclosure, when the HARQ-related field includes the retransmission indication field, an explicit representation and an implicit representation are included in the representation manner of the retransmission indication field. The explicit representation refers to using at least one bit to indicate whether the data frame is a retransmission frame. The implicit representation refers to indirectly indicating whether the data frame is a retransmission frame through whether a modulation scheme of one or more data blocks in the data frame is different from a preset modulation scheme of the one or more data blocks and/or indirectly indicating whether the data frame is the retransmission frame according to whether the receiver is able to find a target frame of the data frame. If the target frame of the data frame can be found, the data frame is a retransmission frame. If the target frame of the data frame cannot be found, the data frame is not a retransmission frame. In a case where the representation manner of the retransmission indication field is the implicit representation, a length of the retransmission indication field is zero.

According to embodiments of the present disclosure, the representation manner of the HARQ indication field includes an explicit representation and an implicit representation. The explicit representation refers to using at least one bit to indicate whether the data frame is required to be processed according to the HARQ process. The implicit representation refers to indirectly indicating whether the data frame is required to be processed according to the HARQ process through whether a modulation scheme of one or more data blocks in the data frame is different from a preset modulation scheme of the one or more data blocks. In a case where the representation manner of the HARQ indication field is the implicit representation, a length of the HARQ indication field is zero.

According to embodiments of the present disclosure, the HARQ-related field further includes the combining manner indication field, and the step in which the sender adds the HARQ-related field into the data frame includes that in a case where the receiver and the sender do not predefine a combining manner, the sender adds the combining manner indication field into the data frame.

According to embodiments of the present disclosure, before the sender adds the combining manner indication field to the data frame, the apparatus for transmitting a data frame further includes a determination module (not shown). The determination module is configured to adaptively determine the combining manner of the data frame according to a channel situation, or the sender and the receiver negotiate in advance to determine the combining manner of the data frame. Accordingly, the adding module 410 may be specifically configured to add the combining manner indication field into the data frame, which includes that the sender adds the determined combining manner into the data frame through the combining manner indication field.

Figure 5:
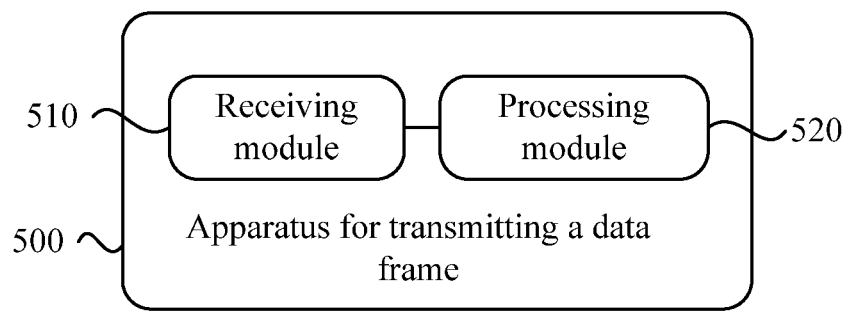
FIG. 5 is a block diagram illustrating a structure of an apparatus for transmitting a data frame according to another embodiment of the present disclosure.

FIG. 5 is a block diagram illustrating a structure of an apparatus for transmitting a data frame according to an embodiment of the present disclosure. Referring to FIG. 5, an apparatus 500 for transmitting a data frame according to the embodiment of the present disclosure may be a device on a receiving side and may include a receiving module 510 and a processing module 520.

The receiving module 510 is configured to receive a data frame from a sender. The data frame carries a hybrid automatic repeat request (HARQ)-related field.

The processing module 520 is configured to process the data frame according to the HARQ-related field.

According to embodiments of the present disclosure, the HARQ-related field may include a HARQ indication field and an identity identification field, the HARQ indication field indicates whether the data frame is required to be processed according to a HARQ process, and the identity identification field indicates an identity identification of a target receiver of the data frame so as to determine the transmission target of the data frame.

According to embodiments of the present disclosure, the apparatus for transmitting a data frame and the sender may be in the same wireless local area network.

According to embodiments of the present disclosure, the apparatus for transmitting a data frame can process the data frame according to the HARQ-related field in the data frame after receiving the data frame to which the HARQ-related field has been added. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

The processing module 520 of the apparatus 500 as the device on the receiving side processes the data frame according to the HARQ-related field, which has been described in detail with reference to FIG. 2 and will not be repeated here.

Figure 6:
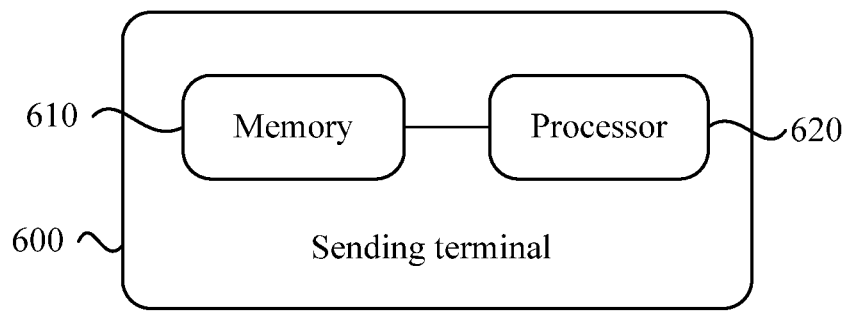
FIG. 6 is a schematic diagram of a sending terminal according to an embodiment of the present disclosure.

FIG. 6 is a schematic diagram of a sending terminal according to an embodiment of the present disclosure. Referring to FIG. 6, a sending terminal 600 provided in the embodiment of the present disclosure may include a memory 610 and a processor 620. The memory 610 can store a computer program. The computer program is configured to, when executed by the processor 620, implement any of the preceding methods for transmitting a data frame. For example, when the computer program is executed by the processor 620, the following operations can be performed: adding a HARQ-related field into the data frame and transmitting the data frame with the added HARQ-related field to at least one receiver, where the HARQ-related field includes a HARQ indication field and an identity identification field, the HARQ indication field indicates whether the data frame is required to be processed according to a HARQ process, and the identity identification field indicates an identity identification of a target receiver among the at least one receiver so as to determine the transmission target of the data frame.

According to embodiments of the present disclosure, the sending terminal adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

Figure 7:
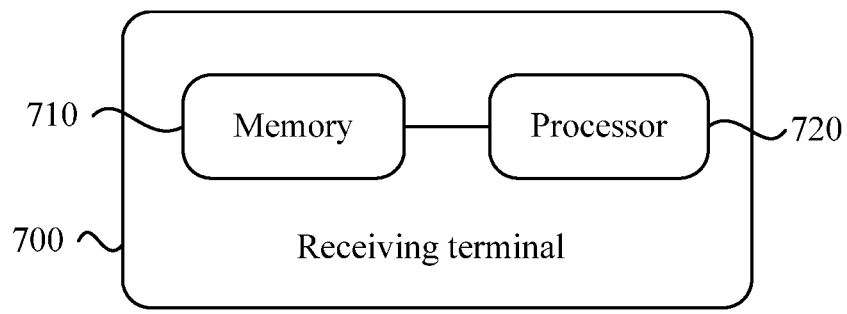
FIG. 7 is a schematic diagram of a receiving terminal according to an embodiment of the present disclosure.

FIG. 7 is a schematic diagram of a receiving terminal according to an embodiment of the present disclosure. Referring to FIG. 7, a receiving terminal 700 according to the embodiment of the present disclosure may include a memory 710 and a processor 720. The memory 710 can store a computer program. The computer program is configured to, when executed by the processor 720, implement any of the preceding methods for transmitting a data frame. For example, when the computer program is executed by the processor 620, the following operations can be performed: receiving a data frame from a sender, where the data frame carries a HARQ-related field; and processing the data frame according to the HARQ-related field. The HARQ-related field includes a HARQ indication field and an identity identification field, the HARQ indication field indicates whether the data frame is required to be processed according to a HARQ process, and the identity identification field indicates an identity identification of a target receiver of the data frame so as to determine the transmission target of the data frame.

According to embodiments of the present disclosure, the receiving terminal can process the data frame according to the HARQ-related field in the data frame after receiving the data frame to which the HARQ-related field has been added. Compared with the traditional ARQ processing method, the data frame processing based on the HARQ can improve the data transmission efficiency. According to embodiments of the present disclosure, the HARQ mechanism is introduced into the data frame processing in the wireless local area network. The efficiency of data transmission in the wireless local area network can be greatly improved.

In addition, according to embodiments of the present disclosure, a non-transitory computer-readable storage medium may further be provided. The storage medium stores a computer program. When the computer program is executed, any of the preceding methods for transmitting a data frame is implemented. For example, when the computer program is executed, the following operations are performed: adding a HARQ-related field into the data frame and transmitting the data frame with the added HARQ-related field to at least one receiver, where the HARQ-related field includes a HARQ indication field and an identity identification field, the HARQ indication field indicates whether the data frame is required to be processed according to a HARQ process, and the identity identification field indicates an identity identification of a target receiver among the at least one receiver so as to determine the transmission target of the data frame. Alternatively, for example, when the computer program is executed, the following operations are performed: receiving a data frame from a sender, where the data frame carries a HARQ-related field; and processing the data frame according to the HARQ-related field. The HARQ-related field includes a HARQ indication field and an identity identification field, the HARQ indication field indicates whether the data frame is required to be processed according to a HARQ process, and the identity identification field indicates an identity identification of a target receiver of the data frame so as to determine the transmission target of the data frame.

According to the non-transitory computer-readable storage medium in embodiments of the present disclosure, the sender adds the HARQ-related field to the data frame sent to the receiver so that after the receiver receives the data frame, the data frame can be processed according to the HARQ-related field in the data frame. Compared with the traditional ARQ processing method, the data frame processing based on the HARQ can improve the data transmission efficiency. According to embodiments of the present disclosure, in a case where the receiver and the sender are in the same wireless local area network, the method of introducing the HARQ mechanism into the data frame processing in the wireless local area network can greatly improve the efficiency of data transmission in the wireless local area network.

It is to be understood by those skilled in the art that the embodiments of the present disclosure may be provided as methods, apparatuses or computer program products. Therefore, the present disclosure may adopt hardware embodiments, software embodiments, or a combination of hardware and software embodiments. In addition, the present disclosure may adopt the form of a computer program product implemented on one or more computer-usable storage media (including, but not limited to, a disk memory, a CD-ROM and an optical memory, etc.) that include computer-usable program codes.

The present disclosure is described with reference to flowcharts and/or block diagrams of methods, devices (systems) and computer program products according to embodiments of the present disclosure. It is to be understood that computer program instructions may implement each flow and/or block in the flowcharts and/or block diagrams and a combination of flows and/or blocks in the flowcharts and/or block diagrams. These computer program instructions may be provided for a processor of a general purpose computer, a special purpose computer, an embedded processor or another programmable data processing device to produce a machine, so that instructions, which are executed via the processor of the computer or another programmable data processing device, create a means for implementing the functions designated in one or more flows in the flowcharts or in one or more blocks in the block diagrams.

These computer program instructions may also be stored in a computer-readable memory which is able to direct a computer or another programmable data processing device to operate in a particular manner, so that the instructions stored in the computer-readable memory produce an article of manufacture including instruction means which implement the functions designated in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions designated in one or more flows in the flowcharts and/or one or more blocks in the block diagrams.

In a typical configuration, a calculating device includes one or more processors (CPUs), an input/output interface, a network interface, and a memory.

The memory may include a non-persistent memory, a random-access memory (RAM), and/or a non-volatile memory in the computer-readable medium, such as a read-only memory (ROM) or a flash RAM. A memory is an example of a computer-readable medium.

Computer-readable media includes a persistent, non-persistent, removable and non-removable media. A field can be stored by using any method or technology. The field may be a computer-readable instruction, a data structure, a program module or other data. Examples of the computer storage medium include, but are not limited to, a phase change memory (PRAM), a static random-access memory (SRAM), a dynamic random-access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other non-transmission medium capable of storing a field that can be accessed by a calculating device. As defined herein, computer-readable media does not include transitory computer-readable media such as modulated data signals and carriers.

It is to be noted that the term "comprise", "include" or any other variant thereof is intended to encompass a non-exclusive inclusion so that a process, method, article or device that includes a series of elements not only includes those elements but also includes other elements that are not expressly listed or are inherent to such a process, method, article or device. In the absence of more restrictions, the elements defined by the statement "comprising a . . . " do not exclude the presence of additional identical elements in the process, method, article or device that includes the elements.

It is to be understood by those skilled in the art that the embodiments of the present disclosure may be provided as methods, systems or computer program products. Therefore, the present disclosure may adopt hardware embodiments, software embodiments, or a combination of hardware and software embodiments. In addition, the present disclosure may adopt the form of a computer program product implemented on one or more computer-usable storage media (including, but not limited to, a disk memory, a CD-ROM and an optical memory, etc.) that include computer-usable program codes.

The specific embodiments of the description are described above. Other embodiments are within the scope of the appended claims. In some cases, the actions or steps recited in the claims may be performed in a sequence different from the sequence in the embodiments and the desired results may also be achieved. In addition, the processes depicted in the drawings are not necessarily to be performed in the specific sequences or successive sequences shown to achieve the desired results. In some embodiments, multitasking and parallel processing are also possible or may be advantageous.

What is claimed is:

1. A method for transmitting a data frame, comprising:
determining, by a sender, whether enabling a hybrid automatic repeat request (HARQ) process;
modulating, by a sender, a signal (SIG) field of preamble portion of the data frame using different modulation schemes for indicating whether enabling the HARQ process; and
transmitting, by the sender, the data frame whose the SIG field of the preamble portion is modulated using the different modulation schemes to a receiver;
wherein modulating data blocks corresponding to the SIG field using binary phase shift keying (BPSK) modulation indicates that the HARQ process is disabled and modulating the data blocks corresponding to the SIG field using quadrature-binary phase shift keying (Q-BPSK) modulation indicates that the HARQ process is enabled.

2. The method of claim 1, wherein the SIG field comprises a HARQ-related field, and the HARQ-related field comprises a combining manner indication field, indicating how to combine data blocks of the data frame.

3. The method of claim 2, wherein the HARQ-related field comprises a retransmission indication field and a representation manner of the retransmission indication field comprises an implicit representation;
wherein the implicit representation refers to one of: indirectly indicating whether the data frame is a retransmission frame through whether a modulation scheme of one or more data blocks in the data frame is different from a preset modulation scheme of the one or more data blocks, or indirectly indicating whether the data frame is the retransmission frame according to whether a target receiver is able to find a target frame of the data frame, and
a length of the retransmission indication field is zero.

4. The method of claim 2, wherein the HARQ-related field comprises a HARQ indication field and a representation manner of the HARQ indication field comprises an implicit representation;
wherein the implicit representation refers to indirectly indicating whether the data frame is required to be processed according to the HARQ process through whether a modulation scheme of one or more data blocks in the data frame is different from a preset modulation scheme of the one or more data blocks, and a length of the HARQ indication field is zero.

5. A sending terminal, comprising a memory and a processor, wherein the memory stores a computer program, and the computer program is configured to, when executed by the processor, implement the method for transmitting a data frame of claim 1.

6. A non-transitory computer-readable storage medium storing a computer program, wherein the computer program is configured to, when executed, implement the method for transmitting a data frame of claim 1.

7. The method of claim 1, wherein the SIG field comprises a HARQ-related field, and the HARQ-related field comprises:
- a Media Access Control (MAC) address field, indicating that at least one of the following is used: an association identifier of a target receiver, a calculated value related to the association identifier, a packet identifier, a Basic Service Set (BSS) identifier, a MAC address, or a calculated value related to the MAC address.

8. A method for transmitting a data frame, comprising:
receiving, by a receiver, a data frame from a sender;
judging whether a hybrid automatic repeat request (HARQ) process is enabled by identifying a modulation scheme of a signal (SIG) field of preamble portion of the data frame; and
processing, by the receiver, the data frame whose the SIG field of the preamble portion is modulated using different modulation schemes;
wherein data blocks corresponding to the SIG field being modulated using binary phase shift keying (BPSK) modulation indicates that the HARQ process is disabled and the data blocks corresponding to the SIG field being modulated using quadrature-binary phase shift keying (Q-BPSK) modulation indicates that the HARQ process is enabled.

9. A receiving terminal, comprising a memory and a processor, wherein the memory stores a computer program, and the computer program is configured to, when executed by the processor, implement the method for transmitting a data frame of claim 3.

10. A non-transitory computer-readable storage medium storing a computer program, wherein the computer program is configured to, when executed, implement the method for transmitting a data frame of claim 3.

11. The method of claim 3, wherein the SIG field comprises a HARQ-related field, and the HARQ-related field comprises:
- a combining manner indication field, indicating how to combine data blocks of the data frame.

12. The method of claim 3, wherein the SIG field comprises a HARQ-related field, and the HARQ-related field comprises:
- a Media Access Control (MAC) address field, indicating that at least one of the following is used: an association identifier of a target receiver, a calculated value related to the association identifier, a packet identifier, a Basic Service Set (BSS) identifier, a MAC address, or a calculated value related to the MAC address.

* * * * *